Nov. 30, 1948.   H. CAPLAN   2,455,044
PARACHUTE
Filed Nov. 19, 1945   2 Sheets-Sheet 1
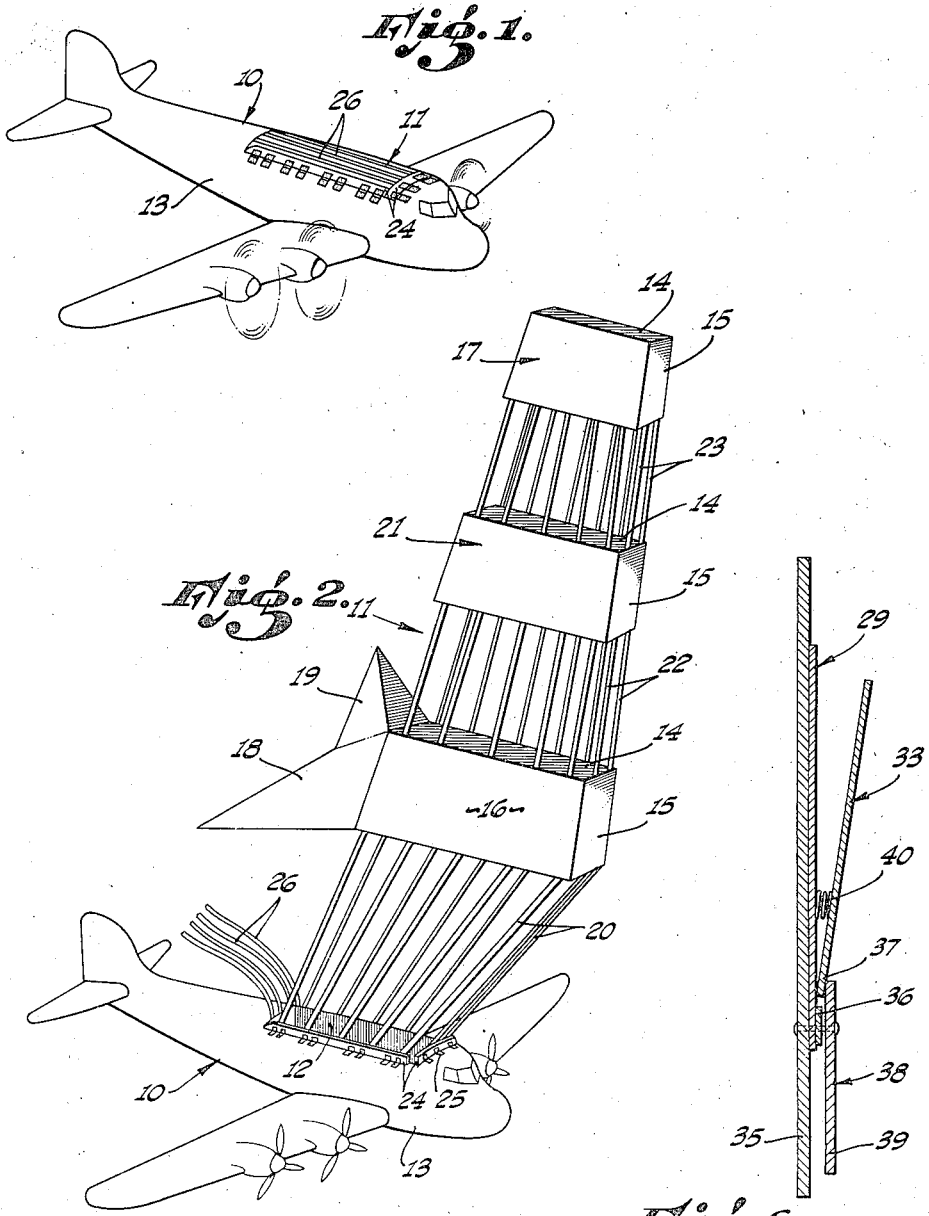
INVENTOR.
HARRY CAPLAN,
BY
Westall & Westall
ATTORNEYS.

Nov. 30, 1948.  H. CAPLAN  2,455,044
PARACHUTE
Filed Nov. 19, 1945  2 Sheets-Sheet 2

INVENTOR.
HARRY CAPLAN,
BY Westall & Westall
ATTORNEYS.

Patented Nov. 30, 1948

2,455,044

UNITED STATES PATENT OFFICE 2,455,044

PARACHUTE

Harry Caplan, Los Angeles, Calif.

Application November 19, 1945, Serial No. 629,587

7 Claims. (Cl. 244—139)

This invention relates to parachutes, and more specifically contemplates an airplane construction adapted to accommodate a composite parachute pack of novel form operable upon release to check the velocity of descent of the aircraft.

While the principles involved in the construction and the use of parachutes is well understood by those in the art, such devices have not heretofore been utilized successfully as a means for facilitating the landing of disabled aircraft. It is generally recognized that much of the damage to aircraft resulting from crash landings due to the engine or structural failures is a consequence of the inability of the pilot to maintain the balance of the craft prior to its landing. In accidents where the maintenance of the balance and direction of flight of the craft has been possible even without retarding the velocity of descent, loss of lives and property has been comparatively small.

It is a principal object of the present invention to provide a composite parachute comprising a plurality of individual compressible air traps normally housed in folded condition within the airplane and adapted upon release to perform the dual function of maintaining the substantial horizontal position of a disabled airplane as well as to reduce the velocity of its descent.

More specifically, it is an object hereof to provide an airplane having a centrally-located compartment in the upper part of the fuselage into which a parachute of the character above alluded to is packed in combination with means for retaining the packed condition of the parachute during normal flight of the craft, the parachute being adapted for facile manual release from the interior of the plane so as to permit external air pressure to expand and activate the parachute.

Another object is the provision of a locking assembly for the series of straps extending across the packed parachute to maintain the same in the compartment, in combination with a manual trip within the aircraft for the locking assembly, the latter being effective when tripped to positively release the straps and correspondingly relieve pressure thereof upon the parachute so as to permit the release of the latter.

Still another object is to provide a series of spring-actuated hinged members normally overlying the forward and side edges of the packed parachute to supplement the straps in preventing inadvertent and untimely release of the parachute incident to the pressure of the flow of air across the fuselage while the airplane is in flight, the hinge members being displaceable by the expanding parachute upon release of the straps.

Numerous other objects, such for example as simplicity of construction, positive assurance of immediate operation in response to tripping of the release mechanism, comparative economy of manufacture and installation and adequate protection against inadvertent release of the parachute, will be apparent to those of skill in the art to which my invention appertains from an examination of the following description, read in the light of the accompanying drawings in which:

Fig. 1 is a perspective view of an airplane equipped with a parachute pack embodying my invention;

Fig. 2 is a view similar to Fig. 1, illustrating the parachute open and in operation;

Fig. 6 is a section on lines 6—6 of Fig. 4.

Figure 3:
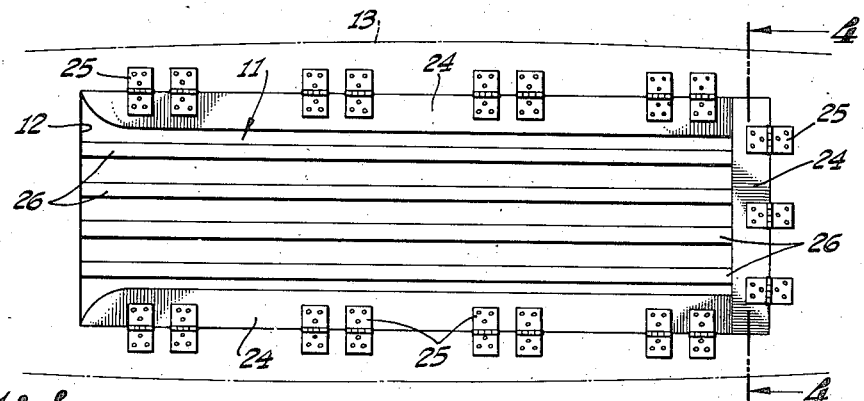
Fig. 3 is a plan view of the parachute pack, showing the lateral retaining plates and straps by which the parachute is maintained within the compartment of the airplane in condition for immediate use.
Figure 4:
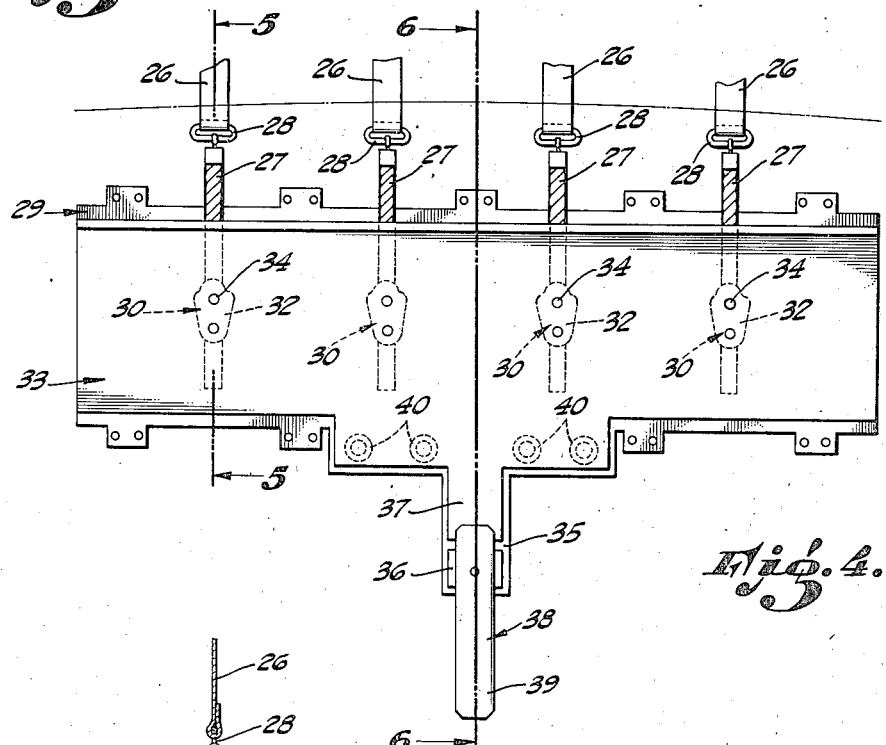
Fig. 4 is an elevation of the locking assembly for the forward ends of the straps, taken on lines 4—4 of Fig. 3.
Figure 5:
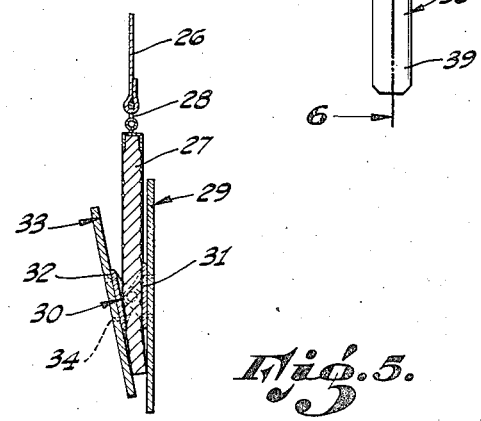
Fig. 5 is a sectional view of one of the clamps of the strap retaining means, taken on lines 5—5 of Fig. 4.

Referring to the drawings in detail, the numerals of which indicate similar parts throughout the several views, 10 designates generally a four-motored airplane of a conventional type. It will be understood that the airplane depicted in the drawings is merely illustrative of any and all types having a sufficient area of the upper portion of the fuselage unobstructed to accommodate the parachute pack 11 about to be described.

An open compartment 12 is provided in the upper part of the fuselage 13 above the center of gravity of the craft. Compartment 11 is of a size to accommodate the composite parachute which itself may vary in size, depending primarily upon the weight of the plane and the precise function to be required of the parachute in use, i. e. the degree to which the parachute is intended to operate as a means for checking the descent of the craft. An important feature of the invention resides in the provision of a device adapted primarily to maintain an aircraft equipped therewith in a substantially horizontal position as it descends, regardless of whether the forward motion of the craft is completely checked or whether the speed of descent is materially reduced. This result may be achieved by a much smaller parachute than one which is required to lower the airplane gently in order to avoid all damage thereto in the landing.

The parachute 11 itself comprises generally three inverted box-like fabric air traps, each preferably rectangular in cross-section and consisting of a top section 14 and side sections 15. The three air traps are preferably of different size, and are arranged one above the other in spaced relation, the largest of the three, designated by numeral 16, being at the bottom, and the smallest parachute 17 at the top of the series. It will be understood that the form of the respective parachutes and their proportions relative to one another may be varied to meet specific requirements. The lowest parachute 16 is provided with a tail section 18 which is of generally pyramidal form with the base thereof connected to the backside section of the lowest parachute, whereby the point of the tail is adapted to trail, the lower side of the tail being open for obvious reasons. Integral with tail section 18 adjacent its base is a pyramidally-shaped air trap 19, open on its underside to communication with the tail section 18. Air trap 19 functions to aid in sustaining the aircraft 10 and particularly assists the tail 18 in maintaining the proper relation between the parachute 16 and craft, e. g., to prevent fouling of the lines.

The tail 18 declines rearwardly to a slight degree with respect to the lower edges of the bottom parachute 16, which declination enables the tail to more effectively fill with air as the airplane moves forwardly during the descent. It will be appreciated that the composite tail section 18 of the lower parachute also performs a function essential in the most practical embodiment of my invention of stabilizing the composite parachute 11 relative to the vertical axis of the airplane 10, thus assuring that the parachute will maintain the same relation to the airplane as the latter moves forward and downward throughout descending flight.

The composite parachute 11 is connected to the airplane by a series of straps 20, the lower ends of which are secured in spaced relation by suitable means within compartment 12 adjacent the edges of the latter and the upper ends secured at corresponding points on the lower edges of the bottom parachute 16. The intermediate parachute 21 is in a similar manner connected by straps 22 to the upper edges of the lower parachute 16, the straps being arranged preferably in equi-spaced relation to minimize the tendency toward distortion of either of the parachutes 16 or 21 in response to variations in air pressures thereon, as well as maintain substantially the predetermined alignment of the parachutes. The uppermost of the three parachutes 17 is connected in substantially the same manner to the intermediate parachute by straps 23.

The precise method of folding the parachute 11 and of arranging it within compartment 12 of the aircraft 10 will be within the skill of those in the art and forms no part of the present invention. It will suffice to point out that in accordance with the invention it is desirable that compartment 12 be no larger than is necessary to accommodate the entire parachute assembly, but that the upper surface of the parachute pack 11 be flush with the normal contour line of the fuselage 13 of the airplane.

A retaining plate 24 is hinged to the fuselage 13 at each side and at the forward edge of the storage compartment 12, so as to normally overlie corresponding side and forward portions of the parachute pack 11. These plates 24 are held against vibration in their normal position upon edges of the parachute by conventional springs (not shown) incorporated in the hinges 25. According to the preferred arrangement of these parts, the forward plate 24 when in operative position overlies the leading edges of the side plates 24, and, with the latter, function during flight of the craft to prevent air current from entering compartment 12 around the parachute 11 which might otherwise tend to dislodge the latter or otherwise disturb the preferred arrangement of the parachute in the compartment.

The exposed upper surface of parachute pack 11 is securely bound by a series of straps 26 of which the four shown in the drawing are illustrative. Corresponding ends of straps 26 are permanently attached to the back of compartment 12 by suitable means (not shown) from which points the straps 26 extend over pack 11 in parallel, equi-spaced relation to the forward end of compartment 12 and thence project downwardly through separate openings (not shown) in the forward wall of the compartment into the interior of the airplane, preferably into the pilot's compartment. A short length of rope or flexible cable 27 is connected by a conventional link 28 to the forward end of each strap 26.

A clamping assembly is provided within the pilot's compartment operable to lock each of the ropes 27 with the straps 26 drawn taut across the parachute pack 11, comprising a vertically arranged baseboard 29 secured by suitable means to a bulkhead or a partitioning wall of the craft adjacent the openings in compartment 12 through which straps 26 extend. A series of clamps 30, each comprising a pair of locking elements 31 and 32 hinged together, are arranged on baseboard 29 in spaced relation corresponding to the spacing of straps 26. To this end one of the elements 31 of each clamp 30 is secured to baseboard 29, the other element 32 being movable relative thereto in order to grip and release the ropes 27, respectively.

A floating control plate 33 overhangs each of clamps 30 and is secured firmly to the outer movable element 32 of each thereof as at 34, whereupon tilting of plate 33 is effective to operate each of clamps 30 and either binds the ropes 27 firmly therein or release the ropes depending upon the direction of movement of the plate 33.

The baseboard 29 is formed with a lower extension 35 on which a block 36 is rigidly secured. The lower end of the control plate 33 is similarly provided with an integral depending tongue 37 which terminates at a point above block 36. A hand-actuated lever 38 is pivoted to block 36 so as to swing in the plane of the baseboard 29 and transverse to the plane of movement of the control plate 33, the upper end of lever 38 being normally disposed over tongue 37 to hold the latter in contiguous relation with the baseboard 29 and clamps 30 in locking engagement with ropes 27 of the respective straps 26. The lower end of the lever 38 provides a depending handle 39 by which the pilot may shift the latching end of the lever 38 out of engagement with tongue 37 of the control plate 33.

In order to assure the positive release of the ropes 27 incident to tripping the handle 39, I provide a helical spring 40 between the baseboard 29 and lower end of control plate 33. Spring 40 is normally held under compression due to the retention in close proximity of baseboard 29 and control plate 33 by the latching lever 38. It will be observed that by tilting latching lever 38 out of engagement wtih tongue 37, spring 40 is effective to force the lower end of control plate 33 outwardly and release clamps 30. Coincidentally the tension upon ropes 27 and straps 26 is released, whereupon the parachute 11 is released from compartment 12, the force of the air crossing the compartment incident to the forward motion of the craft being relied upon to raise the parachute. Straps 26 are thereupon displaced rearwardly and the parachute opens. Correspondingly, as the parachute is drawn out of compartment 12 by the force of the air, the side and forward hinged plates 24 are swung upwardly in response to expansion of the parachute 11.

It will thus be seen that I have provided apparatus associated with an airplane including a composite parachute comprising three principal air traps 16, 17 and 21 spaced apart in vertical alignment, each operable when open to retard the descent as well as the forward motion of the aircraft, and further to assist in maintaining the horizontal disposition of the craft while the latter is lowered, the airplane being equipped with a compartment 12 for housing a parachute in packed condition during flight and in which it is positively retained by straps 26 easily displaceable but normally held in taut condition over the parachute by locking means adapted to be manually tripped from inside of the airplane.

While I have shown and described but one embodiment of my invention, it will be apparent to those of skill in the art that numerous changes in size, design, shape and number of the various parts may be made, that any conventional clamping means may be substituted for that shown, that the straps 26 may, in a modified form of the invention, be gripped directly by the clamping device, the ropes 27 being dispensed with, and that a single clamp may be utilized to engage all of straps 26, without departing from the scope of my invention as defined in the appended claims.

What I claim and desire to secure by Letters Patent is:

1. In apparatus of the character described, an airplane, a parachute comprising a box-like fabric fame having sides and a top, means comprising a plurality of lines connecting said parachute with said airplane, and an auxiliary parachute connected to one side of said fabric parachute frame, tapered to a point to maintain the first-named frame in predetermined relationship with the direction of the air flow around said first-named parachute and supplement the latter in suspending the airplane.

2. In apparatus of the character described, an airplane having an open compartment therein, a parachute pack within said compartment, a plurality of lines overlying said parachute to normally retain said pack in said compartment, a plurality of clamps engaging said lines respectively, a plate overlying said clamps to normally hold the latter in engagement with said lines, resilient means to displace said plate and release said clamps and the lines engaged thereby, and a handle normally holding said plate in a position against the urge of said resilient means with said clamps engaging said lines.

3. In apparatus of the character described, an airplane fuselage having a compartment in the top thereof, a parachute pack disposed entirely within said compartment, a plurality of straps having corresponding ends secured to the fuselage within and at the back of said compartment and extending forwardly longitudinally of the airplane over said parachute pack with the opposite ends of said straps extending downwardly into said compartment at the forward end thereof, the portion of said straps overlying said parachute being substantially flush with the top of said fuselage, and means within said fuselage to releasably retain the forward ends of said straps.

4. In apparatus of the character described, an airplane fuselage having a compartment in the top thereof, a parachute pack disposed entirely within said compartment, a plurality of straps having corresponding ends secured to the fuselage within and at the back of said compartment and extending forwardly longitudinally on the airplane over said parachute pack with the opposite ends of said straps extending downwardly into said compartment at the forward end thereof, the portion of said straps overlying said parachute being substantially flush with the top of said fuselage, means within said fuselage to releasably retain the forward ends of said straps, plates normally overhanging the forward and side edges of said compartment to overlie corresponding edges of said parachute pack and the adjacent reaches of said straps, and means to resiliently retain said plates in their respective operative positions.

5. In apparatus of the character described, an airplane, a parachute, means comprising a plurality of lines connecting said parachute with said airplane, an auxiliary parachute tapering from a wide end to a point, means to connect the wider end of said auxiliary parachute to said first-named parachute with the narrower end thereof projecting rearwardly from the latter so as to maintain the opposite end of the first-named parachute extending in the direction toward which the airplane is headed during use, and to coincidentally assist in sustaining the weight of the airplane.

6. In apparatus of the character described, an airplane, a parachute, means comprising a plurality of lines connecting said parachute with said airplane, an auxiliary parachute tapering from a wide end to a point, means to connect the wider end of said auxiliary parachute to said first-named parachute with the narrower end thereof projecting rearwardly from the latter so as to maintain the opposite end of the first-named parachute extending in the direction toward which the airplane is headed during use, and to coincidentally assist in sustaining the weight of the airplane, said auxiliary parachute embodying an enlarged air trap extending above and communicated with the auxiliary parachute and disposed adjacent the connection of said first-named parachute and said auxiliary parachute to assist in extending and supporting the latter.

7. In apparatus of the character described, an airplane, a parachute, means comprising a plurality of lines connecting said parachute with said airplane, an auxiliary parachute tapering from a wide end to a point, means to connect the wider end of said auxiliary parachute to said first-named parachute with the narrower end thereof projecting rearwardly from the latter so as to maintain the opposite end of the first-named parachute extending in the direction toward which the airplane is headed during use, and to coincidentally assist in sustaining the weight of the airplane, said auxiliary parachute embodying an enlarged air trap extending above and communicated with the auxiliary parachute and disposed adjacent the connection of said first-named parachute and said auxiliary parachute to assist in extending and supporting the latter, said auxiliary parachute being declined rearwardly whereby said first-named parachute is tilted forwardly in response to the upward pressure of air against said auxiliary parachute.

HARRY CAPLAN.

REFERENCES CITED

The following references are of record in the file of this patent:

UNITED STATES PATENTS

| Number | Name | Date |
|---|---|---|
| 1,011,683 | Webb | Dec. 12, 1911 |
| 1,017,998 | Pickard | Feb. 20, 1912 |
| 1,134,884 | Mackay | April 6, 1915 |
| 1,428,013 | Diakoniuk | Sept. 5, 1922 |
| 1,693,518 | Kessler | Nov. 27, 1928 |
| 1,747,215 | Bergh | Feb. 18, 1930 |
| 1,791,871 | Little | Feb. 10, 1931 |
| 1,836,319 | Gehrung | Dec. 15, 1931 |
| 2,120,477 | Adams | June 14, 1938 |
| 2,318,674 | Coleman | May 11, 1943 |